US006767002B2

United States Patent
Kerger et al.

(10) Patent No.: US 6,767,002 B2
(45) Date of Patent: Jul. 27, 2004

(54) CHECK VALVE (75) Inventors: Loll Kerger, Luxembourg (LU); Gary M. Clawson, Sr., Blairsville, PA (US)

(73) Assignee: Torrent Trading Ltd., Tortola (VG)

( * ) Notice: Subject to any disclaimer, the term of this patent is extended or adjusted under 35 U.S.C. 154(b) by 0 days.

(21) Appl. No.: 10/288,826

(22) Filed: Nov. 6, 2002

(65) Prior Publication Data

US 2004/0084091 A1 May 6, 2004

(51) Int. Cl.[7] .............................................. F16L 37/28
(52) U.S. Cl. ............................. 251/149.6; 137/614.03; 137/614.05
(58) Field of Search ................................. 137/538, 540, 137/614.03, 614.05; 251/149.6, 324, 325

(56) References Cited

U.S. PATENT DOCUMENTS

| | | | | |
|---|---|---|---|---|
| 3,199,831 A | * | 8/1965 | Sully | 251/149.6 |
| 3,583,667 A | * | 6/1971 | Amneus, Jr. | 251/149.5 |
| 4,324,239 A | * | 4/1982 | Gordon et al. | 604/122 |
| 4,683,905 A | * | 8/1987 | Vigneau et al. | 137/329.1 |
| 5,330,155 A | * | 7/1994 | Lechner | 251/149.6 |
| 5,460,197 A | * | 10/1995 | Kerger et al. | 137/39 |
| 5,547,166 A | * | 8/1996 | Engdahl | 251/149.6 |
| 5,911,404 A | * | 6/1999 | Cheng | 251/149.6 |
| 6,279,874 B1 | * | 8/2001 | Nyberg | 251/149.6 |

* cited by examiner

Primary Examiner—Ramesh Krishnamurthy
(74) Attorney, Agent, or Firm—Polster, Lieder, Woodruff & Lucchesi (57) ABSTRACT

There is disclosed a check valve for a tap of a gas or a liquefied gas cylinder comprising a valve body member axially movable in a housing bore. The body member has an axial bore opening out through one axial end of the valve body member and being in fluid communication with an annular space surrounding valve body member within the housing bore. The other axial end of the valve body member is closed and carries a primary seal ring gas tightly engaging an inner circumferential surface in the pore in the closed position of the check valve. There is provided a secondary seal ring at the first axial end of the valve body member. The secondary seal ring has an outer sealing surface in gas tight engagement with another circumferential sealing surface in the housing bore and further has an annular contact surface for gas tight engagement by an actuator member urging the valve body member against the force of a spring to the open position in which the primary seal is disengaged from its associated sealing surface of the housing bore.

30 Claims, 4 Drawing Sheets

CHECK VALVE

BACKGROUND OF THE INVENTION

This invention relates to a check valve for a tap for a gas or a liquefied gas cylinder and especially a check valve of this kind which has fever parts, which can be more economically produced and can also be more easily assembled, and which provides advantages in use.

The prior art check valve for a tap for a gas cylinder is a multipart structure comprising a cylindrical sleeve open at both ends, a first or primary seal ring carried by a separate seal support member threaded to the valve housing, a second annular seal disposed in a groove formed in the outer surface of the sleeve, and a third annular seal disposed within the annular sleeve and having a contact surface adapted to be gas tightly engaged by an actuator nipple of a gas pressure reducer when forcing the sleeve member against the force of a check valve closing spring into open position. This known check valve in view of its several parts cannot be economically manufactured and assembled and, moreover, both the first and the second seals are always exposed to the high pressure in the gas cylinder when the cylinder tap is open. Therefore, a check valve for a tap of a gas cylinder is desired, which has advantages in the above respects.

SUMMARY OF THE INVENTION

The object of the invention is to provide an improved check valve for a gas cylinder tap.

Another object of the invention is to provide an improved check valve for a gas cylinder tap which has fewer parts and can be economically produced and assembled.

A further object of the invention is to provide a check valve for a gas cylinder tap, wherein in the closed position of the check valve only the primary seal is exposed to the gas cylinder pressure.

To achieve this object there is provided in accordance with the invention a check valve for a tap of a gas or a liquefied gas cylinder including a housing having a bore therein having an inner circumferential surface, said bore having an axis and a mouth opening in a housing end surface; a valve body member axially movable in the housing bore between a check valve open and a check valve closed position and having a proximal annular portion defining a proximal annular end surface facing the housing bore mouth opening and a distal portion remote from said mouth opening, and said valve body member having gas flow passageway means therein opening out through said proximal portion of said valve body member and being in fluid communication, through the outer circumferential surface of the valve body member, with an annular interfacial gap defined between the outer circumferential surface of the valve body member and the inner circumferential surface of the housing bore; axially spaced primary and secondary seal means on the valve body member, said primary seal means being adapted to sealingly engage an associated generally axially extending primary sealing surface portion on the housing bore inner surface surrounding the valve body member, and said secondary seal means being adapted to sealingly engage at least one associated secondary sealing surface portion on said housing bore inner surface surrounding the valve body member, the primary seal means being on the outer circumferential surface of the valve body member distally of where the gas flow passageway means communicates with said annular interfacial gap, and the secondary seal means being on the valve body member proximally of where the gas flow passageway means communicates with said interfacial gap; spring means urging the valve body member in a proximal direction to the check valve closed position in which the primary seal means is in gas tight engagement with its associated axially extending primary sealing surface portion to prevent gas flow between the gas flow passageway means and a distal plenum chamber delimited between said housing bore and the valve body member, the valve body member being movable in an opposite, distal direction to said check valve open position wherein the primary seal means is distally disengaged from its associated primary sealing surface portion to permit gas flow between the plenum chamber and the gas flow passageway means through said annular interfacial gap; said valve body member having an annular contact surface extending around the gas passageway means at the proximal portion of the valve body member and adapted to be gas tightly engaged by an annular gas ducting member of an actuator means urging the valve body member against the spring force in the opposite, distal direction towards the open position.

The check valve of the invention eliminates the need for a separate seal support member by arranging the check valve primary seal means on the outer circumferential surface of the distal portion of the check valve body member and providing on the inner circumferential surface of the housing bore an axially extending primary sealing surface portion which is gas tightly engaged by the primary seal means in the closed position of the check valve. With the primary seal means in engagement with the axially extending sealing surface portion the annular interfacial gap surrounding the valve body member is isolated in use from the gas cylinder pressure and accordingly the secondary seal means provided for preventing gas leakage from the annular interfacial gap around the exterior of the valve body member beyond the proximal end thereof and out of the housing bore is not exposed to the gas cylinder pressure.

In accordance with another feature of the invention, which can be used together with the improved primary seal means or independently therefrom, the prior art secondary seal means provided to prevent gas leakage around the actuator end portion or proximal portion of the valve body member as well as the sealing ring tightly engageable by the actuator nipple of the gas pressure reducer, are replaced by a one-part annular sealing ring provided at the proximal end of the valve body member. This one-part sealing ring comprises an enlarged mass of resilient sealing material which is deflectable radially outwardly when engaged by the pressure reducer actuator nipple to force it radially outwardly to achieve gas tight sealing contact with the secondary interior sealing surface portion of the housing bore. This reduces wear of the one-part secondary sealing ring since either no or only a light contact of the secondary seal ring with the secondary sealing surface portion of the housing bore is needed when the primary seal means is in the seal engaged position wherein the secondary seal means is not exposed to the gas cylinder pressure. When the valve body member is urged to the open position the secondary one-part sealing ring is urged outwardly into enhanced gas tight sealing contact with the housing bore inner surface to prevent leakage of gas from the annular interfacial gap beyond the proximal end of the valve body member to the annular space surrounding the actuator nipple of the gas pressure reducer in the housing bore and therefrom out of the bore mouth opening to the environment of the gas cylinder tap.

The axially extending primary sealing surface portion formed in the housing bore for the primary seal means preferably has inclined outwardly extending ramp surfaces at both ends thereof to facilitate insertion of the valve body member with the primary seal means thereon into the housing bore during assembly and movement of the primary seal means from the check valve open position to the check valve closed position without causing damage to the primary seal means.

In accordance with another preferred feature of the invention the primary and the secondary seal means are rubber seals bonded by vulcanization to the metallic main part of the valve body member, whereby the valve body member is in fact a single part structure and the check valve comprises only three parts, namely the unitary valve body member, the return spring urging the check valve into its closed position after disengagement of the gas pressure reducer actuator nipple from the check valve body member, and a split retaining ring for retaining the check valve body member in the housing bore.

In accordance with another aspect of the invention, there is provided a check valve for a tap of a gas or a liquefied gas cylinder including a housing having a bore therein having an inner circumferential surface, said bore having an axis and a mouth opening in a housing end surface; a valve body member axially movable in the housing bore between a check valve open and a check valve closed position and having a proximal annular portion defining a proximal annular end surface facing the housing bore mouth opening and a distal portion remote from the mouth opening; primary seal means supported on one of the valve body member and the housing and cooperating with a primary sealing surface provided on the other of the valve body member and the housing, said primary seal means being in gas tight engagement with the primary sealing surface in the check valve closed position of the valve body member to thereby prevent gas flow between a gas flow passageway means formed in the interior of the valve body member and a distal plenum chamber delimited between said housing bore and the valve body member, and said primary seal means being disengaged from the primary sealing surface in the check valve open position of the valve body member to place the plenum chamber in fluid communication with the gas flow passageway means of the valve body member; spring means urging the valve body member in a proximal direction to the check valve closed position in which the primary seal means is in gas tight engagement with the primary sealing surface, the valve body member being movable against the spring force in an opposite, distal direction towards the check valve open position; and the valve body member having a secondary seal means comprising a secondary annular sealing element arranged at the proximal portion of the valve body member and having a proximally facing annular end surface defining the proximal end surface of the valve body member, said secondary sealing element having at least one annular sealing surface adapted to gas tightly engage a first secondary sealing surface portion on the housing bore inner surface, and said secondary sealing element being provided with an annular contact surface extending around the gas passageway means at the proximal portion of the valve body member and adapted to be gas tightly engaged by an annular gas ducting member of an actuator means urging the valve body member against the spring force in the opposite distal direction towards the open position.

In one embodiment the spring means surrounds the valve body member and engages a shoulder of the valve body member intermediate the opposite ends thereof and another shoulder in the housing bore between the primary and secondary sealing surface portions of different diameters in the housing bore. In another embodiment the spring means is between the distal end face of the valve body member and a bottom surface of the housing bore. In this embodiment the primary and secondary sealing surface portions in the housing bore may be of the same diameter and formed by a single continuous constant diameter surface portion of the circumferential surface of the housing bore.

In a further modified embodiment the secondary seal means is formed by a layer or coating of sealing material applied to the distal end portion of the valve body member. This coating of sealing material has in addition to the annular contact surface and the radially outwardly facing sealing surface for gas tightly engaging the secondary sealing surface portion of the housing bore inner surface, an additional distally facing sealing surface portion for gas tightly engaging an associated proximally facing sealing surface of the housing bore when the valve body member is in the check valve open position.

SHORT DESCRIPTION OF THE DRAWINGS

The invention will now be described in greater detail with respect to the accompanying drawings, wherein.

DESCRIPTION OF THE STATE OF THE ART

Figure 1:
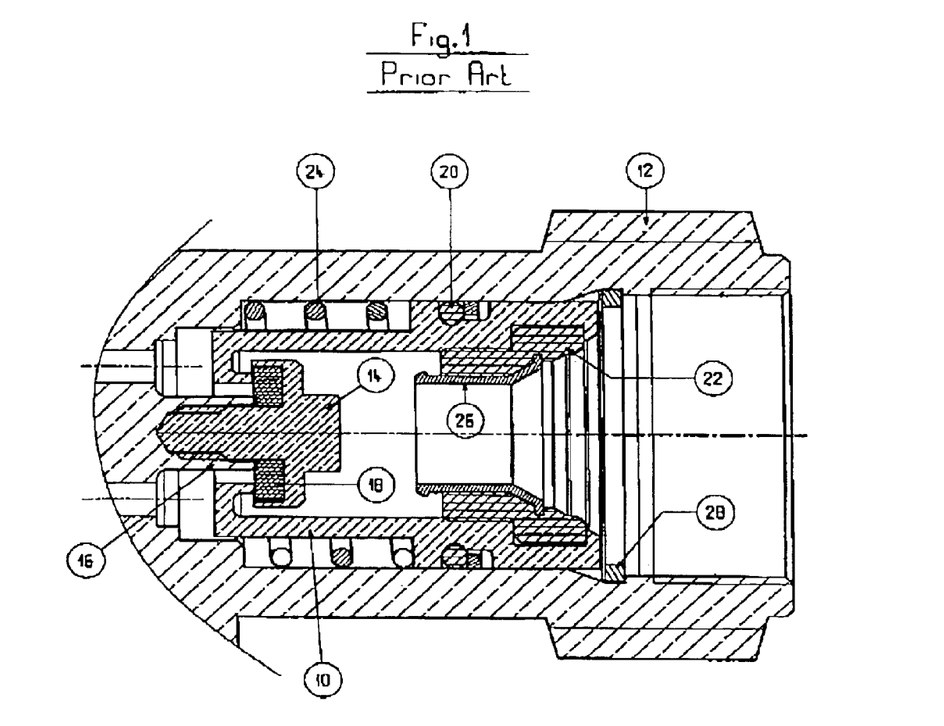
FIG. 1 is a sectional view of the prior art check valve.

Referring first to FIG. 1, the prior art check valve comprises a cylindrical sleeve member 10 open at both ends and disposed in a bore formed within a housing 12 which is a part of a gas cylinder tap (not shown). A primary seal support member 14 is threaded to an axial projection 16 in the bore of the housing member 12 and holds the primary seal 18 within the interior of the open-ended sleeve 10. One end of the open-ended sleeve 10 has a radially inwardly extending flange provided with an axially inturned seat that is engageable with the primary seal 18.

The open-ended sleeve 10 has a secondary seal 20 retained in the groove in an outer circumferential surface of the sleeve 10 and a third inner seal ring 22 is retained within a groove formed in the interior surface of the sleeve 10. This third seal ring 22 has a contact surface adapted to be tightly engaged by the actuator nipple of the gas pressure reducer (not shown) when extended to urge the check valve against the force of a spring 24 to its open position. The third inner seal ring 22 further has a stabilizing ring 26 for retaining it in a centered position within the interior of the sleeve 10. Finally, a split spring ring 28 engaged in a groove of the housing bore retaines the sleeve 10 within the housing bore.

Thus, it can be seen that the known check valve consists of several parts and accordingly it cannot be economically produced. Moreover, assembly requires several steps, namely arranging the primary seal 18 on the primary seal retainer 14 and arranging the secondary seal 20 and the third seal 22 on the check valve sleeve 10. Thereafter, the check valve sleeve 10 with the primary seal retainer 14 loosely arranged therein as to be inserted into the housing bore. The split retainer ring 28 is then placed in its retention groove and finally the primary seal retainer 14 is threaded into its threaded ore in the projection 16 of the bottom of the housing bore to complete assembly.

BEST MODE FOR CARRYING OUT THE INVENTION

Figure 2:
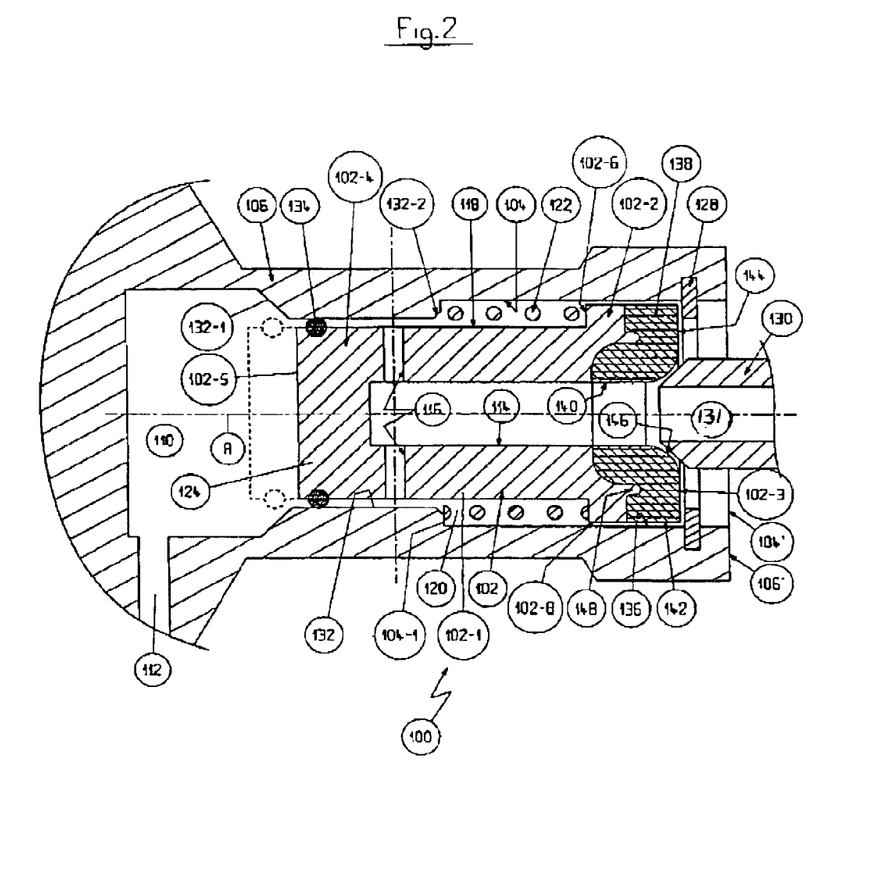
FIG. 2 is a sectional view of the check valve according to the invention.

Referring now to FIG. 2, which shows the improved check valve 100 according to the invention, it can be seen that it comprises a valve body member 102 having a main part 102-1 of metallic material such as brass disposed in a bore 104 of a housing 106. The bore 104 has a longitudinal axis A and a mouth opening 104' in an end surface 106' of the housing 106. The valve body member 102 is axially movable in the housing bore 104 and has a proximal portion 102-2 defining a proximal end face 102-3 facing the bore mouth opening 104' and a distal portion 102-4 having an oppositely facing end face 102-5 delimiting a gas pressure chamber 110 in the housing bore 104. The gas pressure chamber 110 is in communication through a passageway 112 formed in the housing 106 with the gas cylinder (not shown) when the gas tap (not shown) is open. It is noted that the housing 106 of the check valve 100 is a portion of the housing of the gas cylinder tap.

The distal portion 102-4 of the valve body member 102 has a closed end wall 124 and the valve body member 102 further has an axial internal bore 114 therein which is closed at one end by said end wall 124 and opens out through the proximal end face 102-3 of the valve body member 102 that is opposite to the dosed end wall 124 thereof. At least one generally radially extending flow passageway 116 communicates at its radial inner end with the internal bore 114 and opens out at its radial outer end in the circumferential outer surface 118 of the valve body member 102 between the opposite proximal and distal end faces 102-3, 102-5 of the valve body member 102. There may be a plurality of flow passageways 116 spaced circumferentially from one another, only two being shown in FIG. 2. Further, these flow passageways need not be normal to the longitudinal axis of the valve body member 102 but may be inclined at an angle to the longitudinal axis of the valve body member 102 which is coincident with the longitudinal axis A of the housing bore 104. The flow passageways 116 are in fluid communication with an annular interfacial gap 120 surrounding the valve body member 102 in the housing bore 104. The flow passages 116 and the internal bore 114 form in fact a gas flow passageway means through the valve body member 102 in fluid communication with the gap 120 and opening out through the proximal end face 102-3 of the valve body member 102.

The valve body member 102 is axially moveable in the housing bore 104 between a check valve closed position and a check valve open position A helical compression spring 122 having one end seating on a shoulder surface 104-1 in the housing bore 104 and an opposite end seating on a radial shoulder surface 102-6 of an enlarged diameter portion 102-8 the valve body member 102 urges the valve body member 102 to the check valve closed position. The distal end face 102-5 of the valve body member 102 is exposed to the gas pressure in a plenum chamber 110 defined in the housing bore 104 at the distal end face 102-5 of the valve body member and this gas pressure assists the spring 122 in moving the valve body member 102 in an axially outward or proximal direction towards the mouth opening 104' of the housing bore 104. Axial outward movement in the proximal direction of the valve body member 102 to the check valve closed position under the action of the spring 122 and the fluid pressure in chamber 110 is limited by a split spring retainer ring 128 engaged in a groove formed in the inner surface of the housing bore 104. An actuator means such as an annular gas ducting nipple member 130 of a gas pressure reducer (not shown) is effective to move the valve body member 102 deeper into the housing bore 104 or in a distal direction to the check valve open position against the force of the spring 122 and the gas pressure in the plenum chamber 110. This check valve open position of the valve body member 102 is shown in FIG. 2 by interrupted lines. The actuator nipple 130 of the gas pressure reducer has a longitudinal bore 131 for communication with the internal axial bore 114 in the valve body member 102.

The valve body member 102 has a primary seal assembly comprising an axially extending primary sealing surface portion 132 on the interior of the housing bore 104 and a primary seal means consisting in the preferred embodiment of an outer sealing ring 134 of resilient sealing material, such as rubber disposed on the valve body member 102 between the distal end face 102-5 and the axial location on the valve body member 102 where the flow passageways 116 communicate with the annular interfacial gap 120.

The primary sealing ring 134 is on the distal portion of the valve body member on the outer circumferential surface thereof. Preferably, the primary sealing ring 134 is provided at the end wall 124 close to the distal end face 102-5 of the valve body member 102 but may also be axially spaced therefrom, towards the location where the flow passageways 18 open out in the outer circumferential surface 118 of the valve body member 102.

In the closed position of the valve body remember 102 the primary sealing ring 134 is in gas tight engagement with the associated axially extending primary sealing surface portion 132 of the housing bore 104 to block communication between the plenum chamber 110, the annular interfacial gap 120 and the flow passageways 116 and accordingly the inner bore 114 of the valve body member 120. In the check valve open position of the valve body member 102 the primary sealing ring 134 is disengaged from the primary sealing surface portion 132 and has been urged by the actuator nipple 130 of the gas pressure reducer distally deeper into the housing bore 104. In this position of the valve body member 102 the primary sealing ring 134 is located in the plenum chamber 110 and fluid communication is established between the plenum chamber 110 and the flow passageways 116 and accordingly the bore 114 and the flow passage 131 in the nipple 130 through the annular interfacial gap 120 delimited between the outer circumferential surface 118 of the valve body member 102 and the inner circumferential surface of the housing bore 104.

The check valve 100 of the invention has an additional or secondary seal means at the other or proximal portion 102-3 of the valve body member 102, namely at the end which is adapted to be engaged by the actuator nipple 130 of the gas pressure reducer (not shown) to urge the valve body member 102 to the check valve open position. This secondary seal means comprises a one-part annular body or ring 138 of resilient sealing material such as rubber, bonded by vulcanization to the main metallic part 102-1 of the valve body member 102 and defining the other or proximal end face 102-3 of the valve body member 102 facing the mouth opening 104' of the housing bore 104. The secondary annular sealing body 138 has at its inner circumference an annular inwardly facing and axially extending surface 140 generally aligned with the surface of the axial bore 114 of the valve body member 102, and at its outer circumferential circumference a first, radially outwardly facing and axially extending annular sealing surface 142 for fluid tight sealing contact with an associated axially extending secondary sealing surface portion 136 on the inner wall of the bore 104, a shaped distally facing surface bonded to a complementary shaped proximally facing surface of the adjacent main metallic part 102-1 of the valve body member 102, an axially facing proximal end surface 144 extending radially inwardly from the outer annular sealing surface 142 and a curved or arcuate contact surface 146 interconnecting the radially extending end surface 144 with the axially extending inner surface 140. In addition to being bonded by vulcanization to the adjacent metal part 102-1 of the valve body member,102 the secondary sealing ring 138 is also mechanically interengaged with the metallic part 102-1 of the body member 102 by an axially extending annular rib and groove interlocking structure 148. The annular secondary sealing ring 138 extends radially from the inner surface of the inner bore 114 to the outer circumferential surface of the valve body member 102 or slightly therebeyond and covers generally the full proximally facing annular end face of the main metallic part 102-1 thereof. The secondary sealing ring 138 has a substantial dimension in the axial and radial direction of the valve body member 102 thereby consisting of an enlarged mass of sealing material which is radially outwardly deflectable or deformable by the actuator nipple of the gas pressure reducer when engaged with the curved or arcuate contact surface 146 to urge the annular outer sealing surface 142 of the secondary sealing ring 138 outwardly to achieve enhanced gas tight sealing contact with the associated secondary sealing surface portion 136 in the housing bore. With the secondary sealing ring 138 being in gas tight sealing contact with the associated sealing surface portion 136 of bore 104 gas leakage from the annular gap 120 around the proximal portion 102-2 of the valve body member 102 to the annular space formed at the proximal end 102-3 of valve body member 102 in the housing bore 104 around the actuator nipple 130 is prevented. The tight engagement between the actuator nipple stem 130 and the rounded, curved or arcuate contact surface 146 prevents gas leakage from bore 114 into the above mentioned annular space around actuator nipple 130 and out of housing bore 104.

It is pointed out that instead of being rounded, curved or arcuate the contact surface 146 may be an outwardly flaring conical or tapered sealing surface 146 engageable with an actuator nipple which may have a rounded leading end. Alternatively, the contact surface of the secondary sealing ring 138 may be on its proximally facing end face. However, in this case the deflection of the secondary sealing ring 138 is limited and the secondary sealing ring 138 may have to be designed to provide continuous gas tight contact between its outer circumferential surface 142 and the secondary inwardly facing surface portion 136 in the housing bore 104, irrespective as to whether the actuator nipple 130 is in contact with the secondary sealing ring 138 or is axially spaced therefrom in a retracted position.

It can accordingly be seen that the primary and secondary sealing rings 134 and 138 are provided to seal opposite ends of the annular interfacial gap 120 or are provided at opposite end portions 102-2, 102-4 of the valve body member 102 and the primary seal ring 134 when in engagement with the associated axially extending primary sealing surface portion 132 isolates the secondary sealing ring 138 from the gas pressure in the chamber 110. When the valve body 102 is in its forward check valve open position, indicated by broken lines in FIG. 2, the secondary sealing ring 138 is deflected radially outwardly in gas tight sealing contact with the associated internal secondary sealing surface portion 136 of the housing bore 104 to prevent gas leakage from the gas pressure chamber 110 through the annular gap 120 passed the secondary sealing ring 138 and out the mouth opening 104' of the housing bore 104. The primary seal means may also be a rubber sealing ring 134 bonded by vulcanization to the main metallic part 102-1 of the valve body member 102 and with both the primary and the secondary sealing rings 134 and 138 so bonded by vulcanization to the main metallic part 102-1 of the valve body member 102 this valve body member 102 consists of a single unitary part which can be easily inserted in bore 104 and retained therein by engaging the split retaining ring 128 in its groove formed in bore 104 to complete assembly of the check valve 100.

In order to facilitate assembly of the check valve 100 the axially extending primary and secondary sealing surfaces 132 and 136 on the inner circumferential wall of the housing bore 104 are of different diameters. The primary sealing surface 132 associated with the primary sealing ring 134 is of smaller diameter than the secondary sealing surface 136 associated with the secondary sealing ring 138. Moreover, the primary sealing surface 132 has at its distal end an outwardly inclined ramp surface 132-1 which faces distally in a direction towards the gas pressure chamber 110 and has at its opposite end an outwardly inclined ramp surface 132-2 which faces proximally towards the housing bore mouth opening 104'. The proximally facing ramp surface 132-2 facilitates assembly and avoids damage to the primary sealing ring 134 during assembly by progressively compressing the primary sealing ring 134 radially inwardly while guiding it into engagement with the primary sealing surface 132. The distally facing ramp surface 132-1 similarly avoids damage to the primary sealing ring 134 by progressively compressing it when the valve body member 102 moves from its open position to the closed position thereof.

In the preferred embodiment the check valve body member 102 has the primary sealing ring 134 engageable with the associated axially extending primary sealing surface portion 132 of the bore 104 and also has the one-part, secondary annular sealing ring 138 at the opposite end thereof. However, the primary sealing ring and axially extending primary sealing surface assembly of the invention may be used without the one-part secondary seal ring 138 and a secondary seal means may be provided consisting of two separate seal rings of the type used in the prior art check valve assembly shown in FIG. 1. Alternatively, the one-part secondary sealing ring 138 of the invention can be used with a prior art primary seal assembly as shown in FIG. 1. Each of the primary and secondary seal means of the invention provides advantages as regards simplification of the structure of the check valve assembly.

Figure 3:
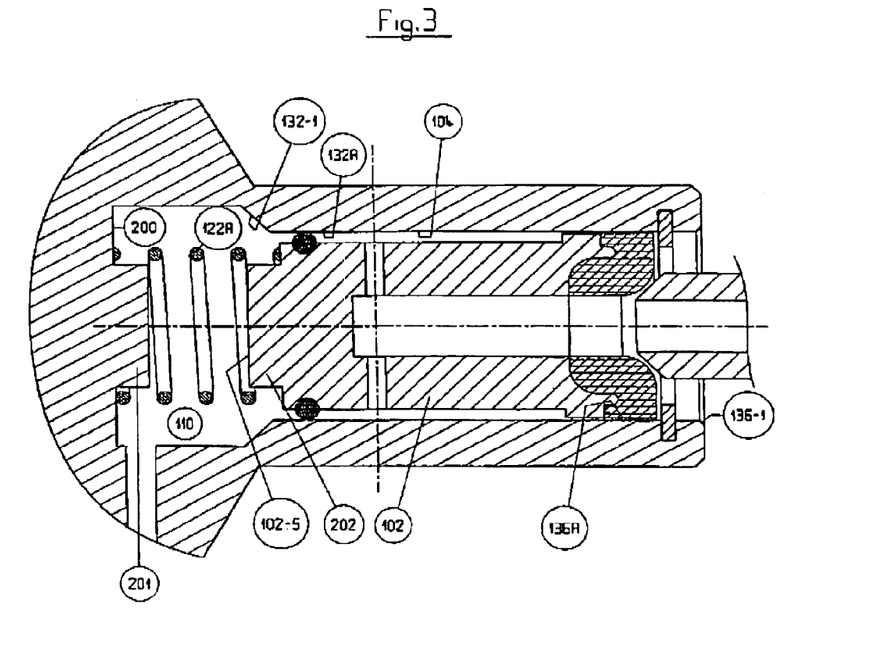
FIG. 3 is a first modified embodiment of the check valve of the invention.

For example, as shown in FIG. 3, the spring 112A could also be arranged in chamber 110 seating at one end on the bottom surface 200 of the housing bore 104 around a centering projection 201 thereof and seating on the other end of the distal end face 102-5 of the valve body member 102 about another centering projection 202 thereof. In this case the primary and secondary sealing surface portions 132A, 136A in the housing bore 104 may have the same diameter and may be formed on a continuous constant diameter inner surface having an inclined ramp surface 132A-1 and 136A-1 at each end.

Figure 4:
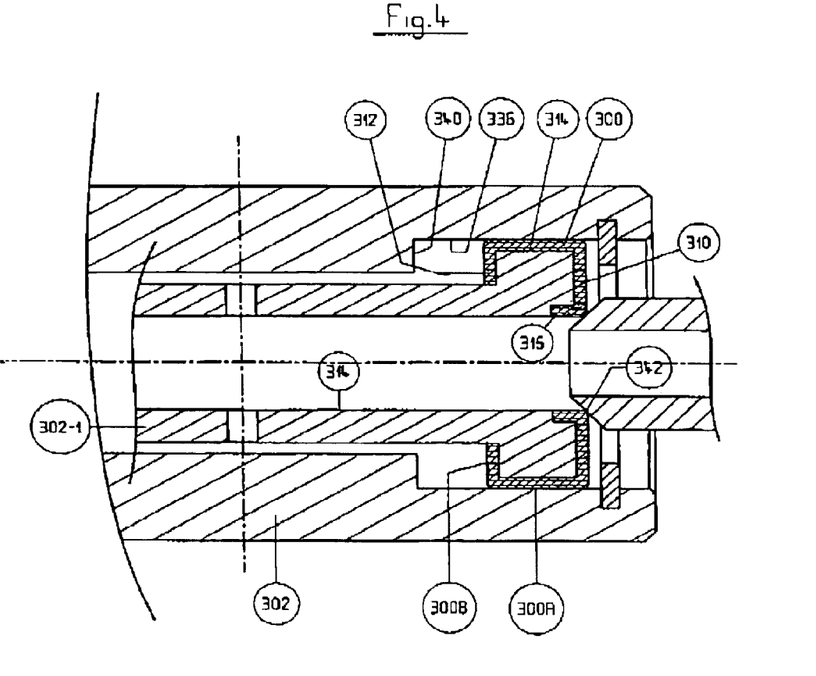
FIG. 4 is a partial view of a second modified embodiment of the check valve according to the invention.

In another modified embodiment, partly shown in FIG. 4, the secondary seal means consists of an annular coating or layer of sealing material 300 applied to the proximal end portion of the main part 302-1 of the valve body member 302. The proximal end portion of the main part 302-1 has a proximally facing annular end surface 310, a distally facing radial shoulder surface 312 and an axially extending outwardly facing circumferential surface 314 therebetween. The layer of sealing material 300 covers all of the surfaces 310, 312 and 314 and further has an inner inturned layer portion 315 extending in distal direction and defining the inner circumferential surface of the bore 314 of the valve body member 302 where it opens out through the proximal end portion of the valve body member. In this embodiment the secondary seal means 300 has two annular sealing surfaces on the outer side of the valve body member 302, namely a first axially extending sealing surface 300A on the portion of the layer of sealing material 300 covering the circumferential surface 314, for tightly engaging the axially extending radially inwardly facing sealing surface portion 336 of the housing bore inner surface and a second distally facing sealing surface 300B tightly engaging a proximally facing shoulder surface 340 in the housing bore in the check valve open position. The annular contact surface 342 is formed on the layer of sealing material 300 at a transitional area 342 between the inturned layer portion 315 and the layer portion overlying the proximally facing end face 310 of the main part 302-1 of the valve body member 302.

In this embodiment the spring means may be disposed around the valve body member 302, as shown in FIG. 2. In this case the layer of sealing material 300 would not extend radially inwardly over the full length of the shoulder surface 312 of the valve body member, to provide a seat area for the spring means. However, the spring means can also be arranged, as shown in the embodiment of FIG. 3, between the distal end surface of the valve body member and the bottom surface of the housing bore.

In the embodiment of FIG. 4 the secondary sealing means is not radially outwardly deformable but provides the advantage of having two annular sealing surfaces 300A, 300B for gas tightly engaging two corresponding or associated sealing surfaces 336, 340 in the housing bore.

The invention is not limited to the embodiments described above and many modifications obvious to one skilled in the art in view of the preceding description can be made thereto without departure from the scope of the invention.

What we claim is:

1. A check valve for a tap of a gas or a liquefied gas cylinder including a housing having a bore therein having an inner circumferential surface, said bore having an axis and a mouth opening in a housing end surface; a valve body member axially movable in the housing bore between a check valve open and a check valve closed position and having a proximal annular portion defining a proximal annular end surface facing the housing bore mouth opening and a distal portion remote from said mouth opening, and said valve body member having gas flow passageway means therein opening out through said proximal portion of said valve body member and being in fluid communication, through the outer circumferential surface of the valve body member, with an annular interfacial gap defined between the outer circumferential surface of the valve body member and the inner circumferential surface of the housing bore; axially spaced primary and secondary seal means on the valve body member, said primary seal means being adapted to sealingly engage an associated generally axially extending primary sealing surface portion on the housing bore inner surface surrounding the valve body member, and said secondary seal means being adapted to sealingly engage at least one associated secondary sealing surface portion on said housing bore inner surface surrounding the valve body member, the primary seal means being on the outer circumferential surface of the valve body member distally of where the gas flow passageway means communicates with said annular interfacial gap, and the secondary seal means being on the valve body member proximally of where the gas flow passageway means communicates with said interfacial gap; spring means urging the valve body member in a proximal direction to the check valve closed position in which the primary seal means is in gas tight engagement with its associated axially extending primary sealing surface portion to prevent gas flow between the gas flow passageway means and a distal plenum chamber delimited between said housing bore and the valve body member, the valve body member being movable in an opposite, distal direction to said check valve open position wherein the primary seal means is distally disengaged from its associated primary sealing surface portion to permit gas flow between the plenum chamber and the gas flow passageway means through said annular interfacial gap; said valve body member having an annular contact surface extending around the gas passageway means at the proximal portion of the valve body member and adapted to be gas tightly engaged by an annular gas ducting member of an actuator means urging the valve body member against the spring force in the opposite, distal direction towards the open position.

2. The check valve of claim 1, wherein the secondary seal means comprises a secondary annular sealing element arranged at the proximal portion of the valve body member and having a proximal annular end surface defining the proximal end surface of the valve body member; said secondary sealing element having at least one annular sealing surface adapted to fluid tightly engage said at least one secondary sealing surface portion on the housing bore inner surface, and said annular contact surface being on said secondary sealing element.

3. The check valve of claim 2, wherein the valve body member has a main part having an annular proximal end face and the secondary sealing element consists of an axially and radially thickened ring of sealing material provided on the proximal end face of said main part, and wherein the annular contact surface of the secondary sealing ring is oriented and shaped so that the secondary sealing ring is radially outwardly deformed when engaged by the actuator means member to achieve enhanced gas tight engagement between the at least one annular sealing surface of the secondary sealing ring and the at least one secondary sealing surface portion on the housing bore inner surface.

4. The check valve of claim 3, wherein the annular contact surface of the secondary sealing ring is a transition surface between the proximal end surface of the secondary sealing ring and an inner circumferential surface thereof defining the gas flow passageway means where it opens out through the proximal portion of the valve body member.

5. The check valve of claim 3, wherein the at least one secondary sealing surface portion on the housing bore inner surface is a generally axially extending secondary sealing surface portion and the annular sealing surface of the secondary sealing element is defined by the outer circumferential surface of the secondary sealing element which extends generally axially.

6. The check valve of claim 2, wherein the valve body 15 member includes a main part having a proximal annular end portion provided with a proximally facing end surface, a distally facing shoulder and a radially outwardly facing circumferential surface therebetween, and wherein the secondary annular sealing element comprises a layer of sealing material applied to the proximal end portion of the main part to overly the proximally facing end surface, the distally facing shoulder and the radially outwardly facing circumferential surface of said main part to thereby provide a first outwardly facing sealing surface and a second distally facing sealing surface thereon for gas tightly engaging corresponding first and second secondary sealing surface portions on the housing bore inner surface.

7. The check valve of claim 6, wherein the first outwardly facing sealing surface of said layer of sealing material and the first secondary sealing surface portion on the housing bore inner surface extend generally axially, and wherein the second distally facing sealing surface of the layer of sealing material and the second secondary sealing surface portion on the housing bore inner surface extend generally radially.

8. The check valve of claim 6, wherein said layer of sealing material has an annular inturned layer portion extending in distal direction and defining the gas flow passageway means where it opens out through said proximal end portion of said valve body member, said annular contact surface being formed on said layer of sealing material at a transitional area between said inturned layer portion and a layer portion overlying the proximally facing end face of the main part of the valve body member.

9. The check valve of claim 5, wherein the generally axially extending secondary sealing surface portion on the housing bore inner surface is of larger diameter than the generally axially extending primary sealing surface portion on the housing bore inner surface.

10. The check valve of claim 9, wherein there is provided an outwardly inclined ramp surface at each end of the axially extending primary sealing surface portion.

11. The check valve of claim 5, wherein the generally axially extending secondary sealing surface portion and the generally axially extending primary sealing surface portion on the housing bore inner surface are formed by a single constant diameter surface of the housing bore.

12. The check valve of claim 11, wherein there is provided an outwardly inclined ramp surface at each end of said single constant diameter surface.

13. The check valve of claim 7, wherein the generally axially extending first secondary sealing surface portion on the housing bore inner surface is of larger diameter than the generally axially extending primary sealing surface portion on the housing bore inner surface.

14. The check valve according to claim 13, wherein there is provided an outwardly inclined ramp surface at each end of the primary sealing surface portion on the housing bore inner surface.

15. The check valve of claim 1, wherein the valve body member includes a main part and the primary seal means comprises a sealing ring of rubber material bonded by vulcanization to the main part.

16. The check valve of claim 2, wherein the valve body member includes a main part and the secondary annular sealing element consists of rubber material and is bonded by vulcanization to the main part.

17. A check valve for a tap of a gas or a liquefied gas cylinder including a housing having a bore therein having an inner circumferential surface, said bore having an axis and a mouth opening in a housing end surface; a valve body member axially movable in the housing bore between a check valve open and a check valve closed position and having a proximal annular portion defining a proximal annular end surface facing the housing bore mouth opening and a distal portion remote from the mouth opening; primary seal means supported on one of the valve body member and the housing and cooperating with a primary sealing surface provided on the other of the valve body member and the housing, said primary seal means being in gas tight engagement with the primary sealing surface in the check valve closed position of the valve body member to thereby prevent gas flow between a gas flow passageway means formed in the interior of the valve body member and a distal plenum chamber delimited between said housing bore and the valve body member, and said primary seal means being disengaged from the primary sealing surface in the check valve open position of the valve body member to place the plenum chamber in fluid communication with the gas flow passageway means of the valve body member, spring means urging the valve body member in a proximal direction to the check valve closed position in which the primary seal means is in gas tight engagement with the primary sealing surface, the valve body member being movable against the spring force in an opposite, distal direction towards the check valve open position; and the valve body member having a secondary seal means comprising a secondary annular sealing element arranged at the proximal portion of the valve body member and having a proximally facing annular end surface defining the proximal end surface of the valve body member, said secondary sealing element having at least one annular sealing surface adapted to gas tightly engage a first secondary sealing surface portion on the housing bore inner surface, and said secondary sealing element being provided with an annular contact surface extending around the gas passageway means at the proximal portion of the valve body member and adapted to be gas tightly engaged by an annular gas ducting member of an actuator means urging the valve body member against the spring force in the opposite distal direction towards the open position.

18. The check valve of claim 17, wherein the valve body member has a main part having an annular proximal end face and the secondary sealing element consists of an axially and radially thickened ring of sealing material provided on the proximal end face of said main part, and wherein the annular contact surface of the secondary sealing ring is oriented and shaped so that the secondary sealing ring is radially outwardly deformed when engaged by the actuator means member to achieve enhanced gas tight engagement between the at least one annular sealing surface of the secondary sealing ring and the first secondary sealing surface portion on the housing bore inner surface.

19. The check valve of claim 18, wherein the annular contact surface of the secondary sealing ring is a transition surface between the proximal end surface of the secondary sealing ring and an inner circumferential surface thereof defining the gas flow passageway means where it opens out through the proximal portion of the valve body member.

20. The check valve of claim 18, wherein the first secondary sealing surface portion on the housing bore inner surface is a generally axially extending secondary sealing surface portion, and the at least one annular sealing surface of the secondary sealing element is defined by the outer generally axially extending circumferential surface of the secondary sealing element.

21. The check valve of claim 17, wherein the valve body member includes a main part having a proximal annular end portion provided with a proximally facing end surface, a distally facing shoulder and a radially outwardly facing circumferential surface therebetween, and wherein the secondary annular sealing element comprises a layer of sealing material applied to the proximal end portion of the main part to overly the proximally facing end surface, the distally facing shoulder and the radially outwardly facing circumferential surface of said main part to thereby provide a first outwardly facing sealing surface and a second distally facing sealing surface thereon for gas tightly engaging corresponding first and second secondary sealing surface portions on the housing bore inner surface.

22. The check valve of claim 21, wherein the first outwardly facing sealing surface of said layer of sealing material and the first secondary sealing surface portion on the housing bore inner surface extend generally axially, and wherein the second distally facing sealing surface of the layer of sealing material and the second secondary sealing surface portion on the housing bore inner surface extend generally radially.

23. The check valve of claim 21, wherein said layer of sealing material has an annular inturned layer portion extending in distal direction and defining the gas flow passageway means where it opens out through said proximal end portion of said valve body member, said annular contact surface being formed on said layer of sealing material at a transitional area between said inturned layer portion and a layer portion overlying the proximally facing end face of the main part of the valve body member.

24. The check valve of claim 17, wherein the valve body member includes a main part and the secondary annular sealing element consists of rubber material and is bonded by vulcanization to the main part.

25. The check valve of claim 17, wherein said gas flow passageway means is in fluid communication, through the outer circumferential surface of the valve body member, with an annular interfacial gap defined between the outer circumferential surface of the valve body member and the inner circumferential surface of the housing bore, wherein the primary seal means is located on the distal portion of the valve body member on the outer circumferential surface thereof beyond the location where the gas flow passageway means communicates with said annular interfacial gap, said primary sealing surface being a generally axially extending primary sealing surface portion on the inner circumferential surface of the housing bore and located distally of the first secondary sealing surface portion, wherein in the check valve closed position of the valve body member in which the primary seal means is in fluid tight engagement with the primary sealing surface portion gas flow is prevented between the plenum chamber and the gas flow passageway means, and in the check valve open position of the valve body member in which the primary seal means is disengaged distally from the primary sealing surface portion gas flow is permitted between the plenum chamber and the gas flow passageway means through the annular interfacial gap.

26. The check valve of claim 25, wherein the first secondary sealing surface portion on the inner circumferential surface of the housing bore is an axially extending sealing surface portion, and wherein the primary sealing surface portion associated with the primary seal means is of smaller diameter than the first secondary sealing surface portion associated with the secondary seal means.

27. The check valve of claim 26, wherein there is provided an outwardly inclined ramp surface at each end of the axially extending primary sealing surface portion.

28. A check valve of claim 25, wherein the valve body 5 member includes a main part and wherein the primary seal means comprises a sealing ring of rubber material bonded by vulcanization to said main part.

29. The check valve of claim 25, wherein the first secondary sealing surface portion on the inner circumferential surface of the housing bore is an axially extending sealing surface portion, and wherein the primary and the secondary sealing surface portions are formed by a single constant diameter surface of the housing bore inner surface.

30. The check valve of claim 29, wherein there is provided an outwardly inclined ramp surface at each end of the constant diameter surface.

* * * * *

UNITED STATES PATENT AND TRADEMARK OFFICE
CERTIFICATE OF CORRECTION

PATENT NO. : 6,767,002 B2
DATED : July 27, 2004
INVENTOR(S) : Loll Kerger and Gary M. Clawson, Sr.

It is certified that error appears in the above-identified patent and that said Letters Patent is hereby corrected as shown below:

Column 6,
Lines 3 and 38, replace "131" with -- 132 --
Line 22, replace "remember" with -- member --

Column 9,
Line 40, replace "dosed" with -- closed --

Signed and Sealed this

Thirty-first Day of May, 2005

JON W. DUDAS
*Director of the United States Patent and Trademark Office*